(12) United States Patent
Bigoness et al.

(10) Patent No.: US 11,479,185 B2
(45) Date of Patent: Oct. 25, 2022

(54) ACTIVE INFRARED ILLUMINATION FOR ENHANCING REAR VISION FROM A VEHICLE

(71) Applicant: Gentex Corporation, Zeeland, MI (US)

(72) Inventors: Keith W. Bigoness, Hudsonville, MI (US); Michael A. Bryson, Hudsonville, MI (US); Joshua D. Lintz, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 127 days.

(21) Appl. No.: 16/778,606

(22) Filed: Jan. 31, 2020

(65) Prior Publication Data

US 2020/0247331 A1      Aug. 6, 2020

Related U.S. Application Data

(60) Provisional application No. 62/800,015, filed on Feb. 1, 2019.

(51) Int. Cl.
*B60R 11/04* (2006.01)
*B60R 1/00* (2022.01)
(Continued)

(52) U.S. Cl.
CPC .............. *B60R 11/04* (2013.01); *B60K 35/00* (2013.01); *B60R 1/00* (2013.01); *H04N 5/332* (2013.01);
(Continued)

(58) Field of Classification Search
CPC .... B60R 2300/8046; B60R 2300/8066; B60R 2300/8026; B60R 2300/103;
(Continued)

(56) References Cited

U.S. PATENT DOCUMENTS

| 4,297,401 A | 10/1981 | Chern et al. |
| 4,418,102 A | 11/1983 | Ferrato |

(Continued)

FOREIGN PATENT DOCUMENTS

| CA | 2290182 A1 | * 7/2000 | ............... B60R 1/00 |
| JP | 09150670 A | * 6/1997 | ............... B60R 1/00 |

(Continued)

*Primary Examiner* — David N Werner
(74) *Attorney, Agent, or Firm* — Price Heneveld LLP; Brian James Brewer

(57) ABSTRACT

An imaging assembly for use in a vehicle is disclosed. The imaging assembly may include an image sensor configured to capture image data and an electro-optic element configured to selectively control a range of wavelengths corresponding to light in a near infrared (NIR) range of light entering the image sensor. The electro-optic element may include a first portion configured to absorb the range of wavelengths entering the image sensor and a second portion configured to absorb the range of wavelengths entering the image sensor in a first state and to transmit the range of wavelengths entering the image sensor in a second state. The second portion may be electrically isolated from the first portion. A controller may be in communication with the image sensor and the electro-optic element. The controller may be operable to switch the second portion between the first state and the second state.

20 Claims, 9 Drawing Sheets

(51) Int. Cl.
  *B60K 35/00* (2006.01)
  *H04N 5/33* (2006.01)
(52) U.S. Cl.
  CPC ... *B60K 2370/152* (2019.05); *B60R 2300/103* (2013.01); *B60R 2300/105* (2013.01); *B60R 2300/106* (2013.01); *B60R 2300/30* (2013.01); *B60R 2300/8053* (2013.01); *B60R 2300/8066* (2013.01)
(58) Field of Classification Search
  CPC ........ B60R 2300/106; B60R 2300/105; B60R 2300/208; B60R 2300/8053; B60R 11/04; H04N 5/238; H04N 13/204; H04N 13/207
  See application file for complete search history.

(56) References Cited

U.S. PATENT DOCUMENTS

| | | |
|---|---|---|
| 4,695,490 A | 9/1987 | McClelland et al. |
| 5,596,023 A | 1/1997 | Tsubota et al. |
| 5,596,024 A | 1/1997 | Horie et al. |
| 5,928,572 A | 7/1999 | Tonar et al. |
| 5,998,617 A | 12/1999 | Srinivasa et al. |
| 6,020,987 A | 2/2000 | Baumann et al. |
| 6,037,471 A | 3/2000 | Srinivasa et al. |
| 6,137,620 A | 10/2000 | Guarr et al. |
| 6,141,137 A | 10/2000 | Byker et al. |
| 6,157,480 A | 12/2000 | Anderson et al. |
| 6,193,912 B1 | 2/2001 | Thieste et al. |
| 6,241,916 B1 | 6/2001 | Claussen et al. |
| 6,249,369 B1 | 6/2001 | Theiste et al. |
| 6,519,072 B2 | 2/2003 | Nishikitani et al. |
| 6,550,949 B1 | 4/2003 | Bauer et al. |
| 6,621,616 B1 | 9/2003 | Bauer et al. |
| 6,667,471 B2 | 12/2003 | Bos et al. |
| 6,714,334 B2 | 3/2004 | Tonar |
| 7,188,014 B1* | 3/2007 | Liao ................ B60R 1/00 362/494 |
| 7,619,680 B1 | 11/2009 | Bingle et al. |
| 8,237,909 B2 | 8/2012 | Ostreko et al. |
| 8,274,729 B2 | 9/2012 | Luten et al. |
| 8,411,245 B2 | 4/2013 | Lee et al. |
| 8,581,982 B1* | 11/2013 | Haley ............... B60Q 1/0023 348/148 |
| 9,434,311 B2 | 9/2016 | Lisowski et al. |
| 10,486,600 B1* | 11/2019 | Havskjold ............ B60R 1/074 |
| 10,674,052 B1* | 6/2020 | Stein ................ H04N 5/2254 |
| 2002/0003571 A1* | 1/2002 | Schofield ........... B60R 11/0235 348/148 |
| 2002/0118282 A1* | 8/2002 | Nakamura ........... B60Q 1/2665 348/148 |
| 2002/0135468 A1* | 9/2002 | Bos ................... G01B 11/026 340/436 |
| 2004/0101165 A1* | 5/2004 | Gallo .................. B60R 1/00 382/104 |
| 2004/0179098 A1* | 9/2004 | Haehn .................. B60R 1/00 348/148 |
| 2005/0168151 A1* | 8/2005 | Shaffer ............... G02B 23/12 315/82 |
| 2006/0071766 A1* | 4/2006 | O'Brien ............... B60Q 9/00 340/442 |
| 2006/0125919 A1* | 6/2006 | Camilleri ............. H04N 7/183 348/148 |
| 2006/0171704 A1 | 8/2006 | Bingle et al. |
| 2008/0007645 A1* | 1/2008 | McCutchen ........... H04N 5/238 348/360 |
| 2008/0122597 A1* | 5/2008 | Englander ............ B60Q 5/006 340/433 |
| 2008/0310005 A1* | 12/2008 | Tonar .................. B60R 1/04 359/265 |
| 2009/0009314 A1* | 1/2009 | Taniguchi ............. B60R 1/00 340/461 |
| 2009/0027497 A1* | 1/2009 | Peacock ............... H04N 7/18 348/143 |
| 2009/0040778 A1* | 2/2009 | Takayanagi ........... H04N 7/183 362/494 |
| 2009/0295906 A1* | 12/2009 | Kushimoto ............ H04N 5/33 348/36 |
| 2010/0182432 A1* | 7/2010 | Augst ................. B60R 1/12 348/148 |
| 2010/0261961 A1* | 10/2010 | Scott ................ A61B 1/00096 600/111 |
| 2010/0321497 A1* | 12/2010 | Onishi ................ B60R 1/10 348/148 |
| 2011/0002028 A1* | 1/2011 | Luten ................. B60R 1/00 359/267 |
| 2011/0018699 A1* | 1/2011 | Chen ................... B60R 1/00 340/435 |
| 2011/0273527 A1* | 11/2011 | Liu .................... B60R 1/12 348/36 |
| 2015/0156427 A1* | 6/2015 | Wagner ............... H04N 5/238 348/148 |
| 2016/0193963 A1 | 7/2016 | Anderson et al. |
| 2017/0217369 A1* | 8/2017 | Endo ................... B60R 21/00 |
| 2017/0349098 A1* | 12/2017 | Uhm ................... B60K 35/00 |
| 2018/0005057 A1* | 1/2018 | Lee .................. G06K 9/00255 |
| 2018/0105101 A1* | 4/2018 | Tatara ................. F21S 43/19 |
| 2018/0141483 A1* | 5/2018 | Irgang ................. F21S 43/19 |
| 2018/0370436 A1* | 12/2018 | Hussler .............. H04N 5/23299 |
| 2019/0202355 A1* | 7/2019 | Tatara .................. B60S 1/56 |
| 2019/0248302 A1* | 8/2019 | Lee ................... B60R 21/0134 |
| 2019/0346742 A1 | 11/2019 | Cammenga et al. |
| 2019/0384313 A1* | 12/2019 | Toth ................... G05D 1/0246 |
| 2020/0099843 A1* | 3/2020 | Kanayama ............ G02B 5/208 |
| 2020/0132889 A1* | 4/2020 | Wippermann ........ H04N 13/207 |
| 2020/0169656 A1* | 5/2020 | Yamaoka ............. H04N 7/181 |
| 2020/0198539 A1* | 6/2020 | Hussler ............... B60K 35/00 |

FOREIGN PATENT DOCUMENTS

| | | | |
|---|---|---|---|
| WO | 9842796 | 10/1998 | |
| WO | 9902621 | 1/1999 | |
| WO | WO-2019008063 A1 * | 1/2019 | ............ G02B 5/005 |

\* cited by examiner

ACTIVE INFRARED ILLUMINATION FOR ENHANCING REAR VISION FROM A VEHICLE

CROSS-REFERENCE TO RELATED APPLICATION

This application claims priority to and the benefit under 35 U.S.C. § 119(e) of U.S. Provisional Application No. 62/800,015, filed on Feb. 1, 2019, entitled ACTIVE INFRARED ILLUMINATION FOR ENHANCING REAR VISION FROM A VEHICLE, the disclosure of which is hereby incorporated herein by reference in its entirety.

TECHNOLOGICAL FIELD

The present disclosure generally relates to enhancing rear vision from a vehicle, and more particularly to enhancing rear vision from a vehicle with active infrared illumination.

BACKGROUND

Near infrared, or "NIR" is defined as electromagnetic radiation in the range of about 700-1400 nm. Most commercial electrochromic systems have been designed to attenuate only the visible portion of the solar spectrum. Since solar energy is, on the average, 7.9% ultraviolet (UV), 45.5% visible radiation, and 46.7% near-infrared (NIR) radiation, over one-half of the total solar energy is not in the visible portion of the spectrum. Addressing exposure to the near infrared portion of the electromagnetic spectrum could be advantageous in some types of electrochromic devices.

SUMMARY OF THE DISCLOSURE

According to one aspect of the present disclosure, a display assembly for use in a vehicle for providing a rearward view from the vehicle is disclosed. The display assembly includes an imaging assembly including an image sensor configured to capture image data, and an electrochromic element configured to selectively control a range of wavelengths of light entering the image sensor, the electrochromic element segregated into an upper portion configured to absorb the range of wavelengths entering the image sensor and a lower portion configured to absorb the range of wavelengths entering the image sensor in a first state and to transmit the range of wavelengths entering the image sensor in a second state, and a controller in communication with the image sensor and the electrochromic element, wherein the controller is configured to switch the lower portion between the first state and the second state in response to an environmental lighting condition.

According to another aspect of the present disclosure, an imaging assembly for use in a vehicle is disclosed. The imaging assembly includes an image sensor that is configured to capture image data of a rearward view. The image sensor has a lower region and an upper region. An electro-optic element is configured to selectively control a range of wavelengths of light entering the image sensor. The electro-optic element includes an upper chamber, a lower chamber that is electrically isolated from a first chamber, and a controller that is in communication with the image sensor and the electro-optic element. The controller is operable to switch at least one of the upper chamber and the lower chamber between an absorbing state and a transmitting state.

According to yet another aspect of the present disclosure, a method of selectively switching an electro-optic element in response to an ambient lighting condition is disclosed. The method includes capturing image data corresponding to an upper region and a lower region of an image sensor and controlling the electro-optic element to absorb a range of near infrared (NIR) wavelengths of light entering an upper region of the image sensor and absorbing the range of NIR wavelengths entering the lower region of the image sensor in a first state and transmitting the range of NIR wavelengths entering the image sensor in a second state in response to an ambient lighting condition.

According to still another aspect of the present disclosure, an imaging assembly is disclosed. The imaging assembly includes an image sensor that is configured to capture image data and an electro-optic element that is configured to selectively control a range of wavelengths corresponding to light in a near infrared (NIR) range of light entering the image sensor. The electro-optic element includes a first portion that is configured to absorb the range of wavelengths entering the image sensor and a second portion that is configured to absorb the range of wavelengths entering the image sensor in a first state and to transmit the range of wavelengths entering the image sensor in a second state. The second portion is electrically isolated from the first portion. A controller is in communication with the image sensor and the electro-optic element. The controller is operable to switch the second portion between the first state and the second state These and other features, advantages, and objects of the present disclosure will be further understood and appreciated by those skilled in the art by reference to the following specification, claims, and appended drawings.

DETAILED DESCRIPTION

It is to be understood that the invention disclosed herein may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 1A:
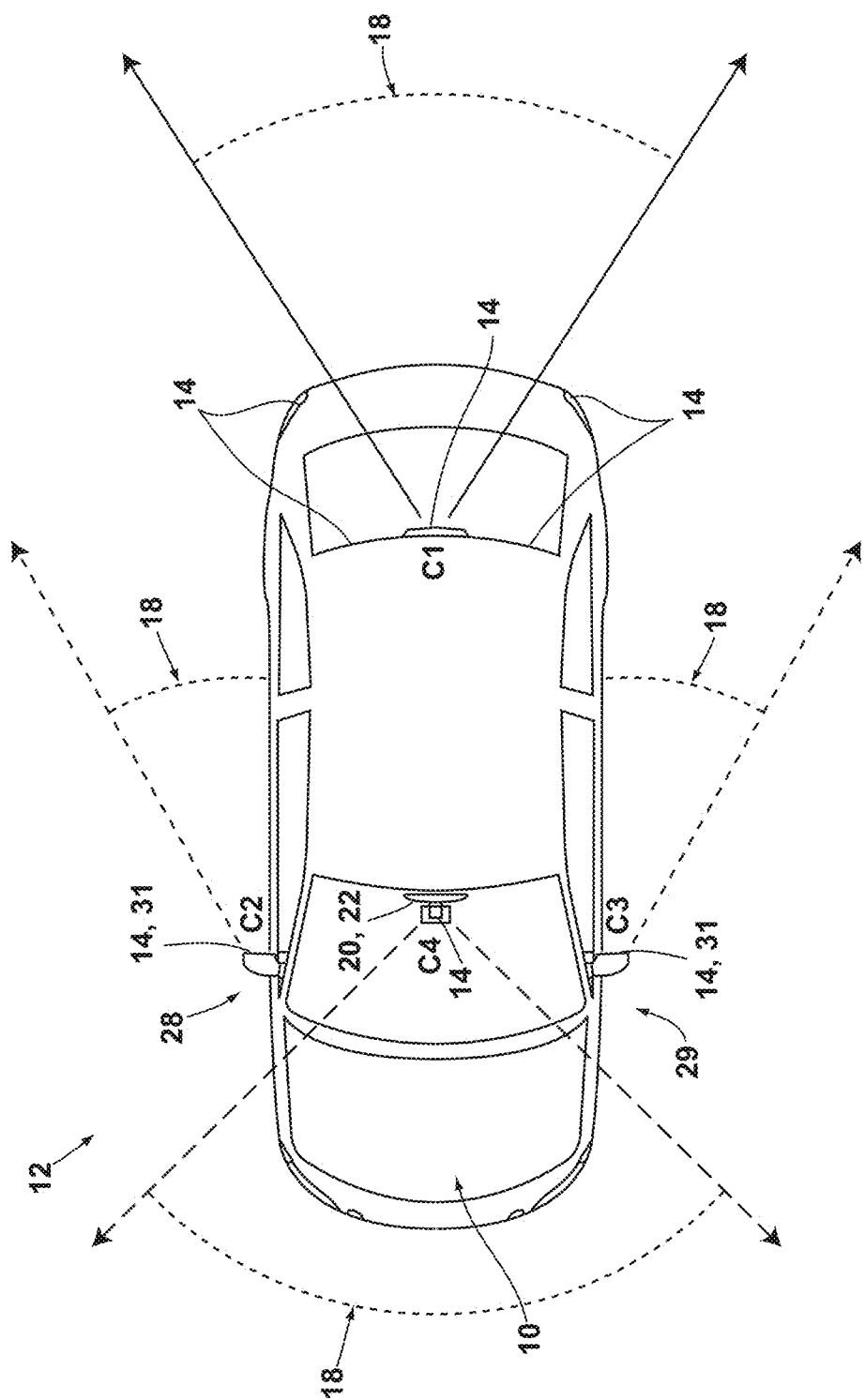
FIG. 1A is a top view of a vehicle comprising an imaging system.

FIG. 1A demonstrates an elevational view of a vehicle 10 comprising an imaging system 12. Vehicles may require more sensors and cameras as more autonomous functions are added to the vehicle. Practical limitations may exist in the number of sensors that can be added. It is beneficial, therefore, to develop camera and sensor systems that are capable of multiple functions. This will not only reduce the immediate complexity of the sensor system itself, but it will also require less wiring and support infrastructure.

In the case of cameras, additional cost savings may be obtained by integrating additional functionality into a single camera. For example, a traditional camera may include a sensor, which is sensitive to visible and near-infrared light. In some environments, to achieve good color rendering the near infrared (NIR) light may be blocked.

Figure 1B:
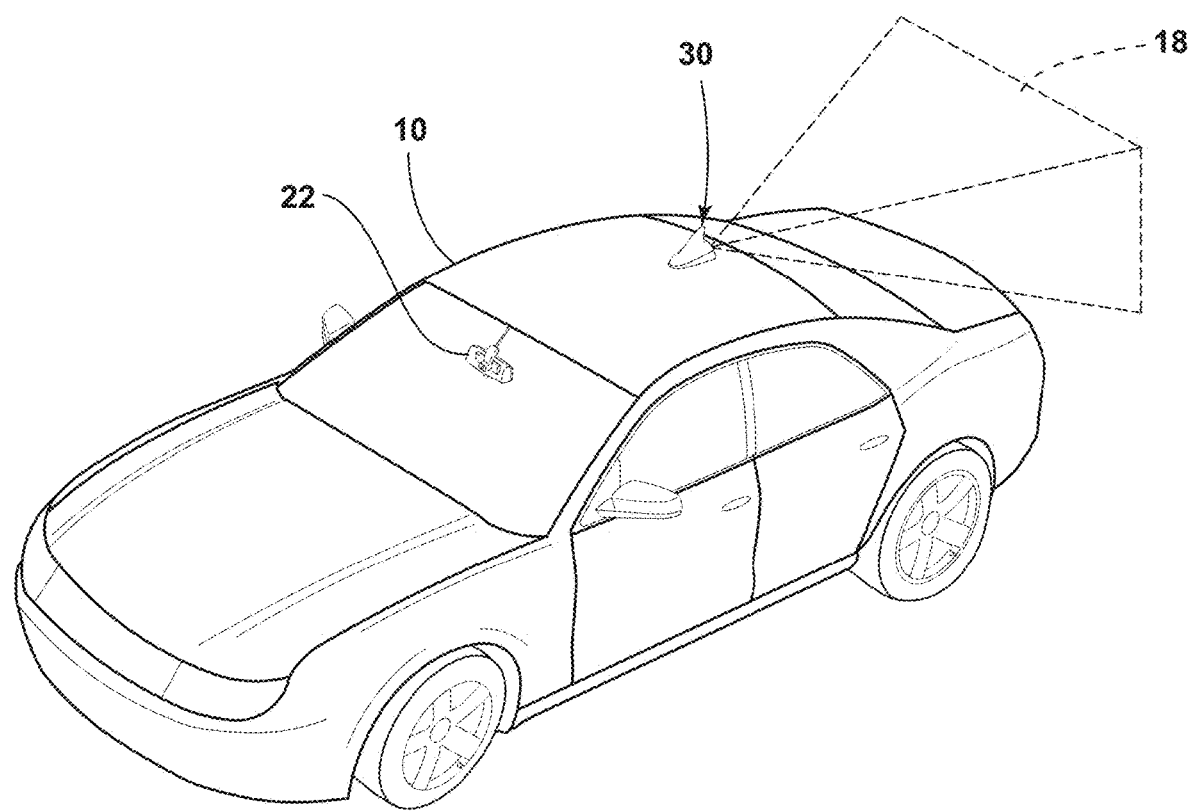
FIG. 1B is a top perspective view of one embodiment of a roof-mounted antenna and imager module installed on a roof of the vehicle of FIG. 1A.
Figure 1C:
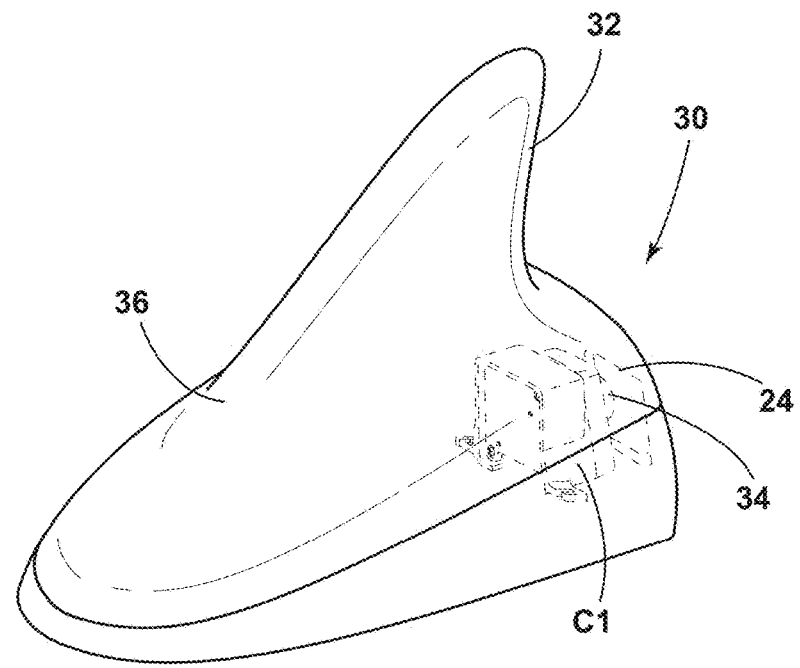
FIG. 1C is a front top perspective view of the roof-mounted antenna and imager module of FIG. 1B.

Referring to FIGS. 1A, 1B, and 1C, the imaging system 12 may include one or more imaging devices 14. In some embodiments, the imaging system 12 may include a plurality of imaging devices 14 including a first imaging device C1, a second imaging device C2, a third imaging device C3, and a fourth imaging device C4. An image sensor 16 (FIG. 2) of each of the imaging devices 14 may have a field of view 18 focusing on an environment proximate the vehicle 10. In some aspects, the field of view 18 is directed rearward of the vehicle 10. In the various embodiments discussed herein, the imaging devices C1-C4 may be implemented to provide views of the environment proximate, or rearward of, the vehicle 10 that may be displayed on a display screen 20 or any form of display device. The display screen 20 may be incorporated in a rearview display 22, positioned similar to a conventional rearview mirror, incorporated in an interior console, or provided in various portions of the vehicle 10, such as side mirrors 31. In some examples, the display screen 20 is a full display mirror, or a partial display mirror.

The imaging devices 14 may be arranged in various locations on the vehicle 10. In an exemplary embodiment, the imaging devices 14 may be arranged such that each of a plurality of fields of view 18 of the imaging devices C1-C4 is configured to capture a significantly different portion of the surrounding environment. Each of the imaging devices 14 may include any form of device configured to capture image data. For example, the imaging devices 14 may be implemented as Charge Coupled Devices (CCD) and Complementary Metal Oxide Semiconductor (CMOS) image sensors, but are not limited to such.

In some embodiments, one or more of the imaging devices 14 may also include specialized infrared (IR) image sensors, which may correspond to thermal imaging cameras comprising focal plane arrays (FPAs) configured to respond to wavelengths 9000-14000 nm (e.g., intermediate and long wavelength infrared). Some types of IR image sensors may include InSb FPAs, InGaAs FPAs, and quantum-well infrared photodetectors MA/IP FPAs. Additionally, microbolometers (e.g., amorphous silicon (a-Si), vanadium oxide (VOx)) may be implemented as FPA image sensors. In some embodiments, one or more of the imaging devices 14 may include a near-infrared enhanced CMOS sensor, where the sensor may have a thicker epitaxial layer providing higher quantum efficiencies for wavelengths between 700 to 1000 nm.

Though four imaging devices C1, C2, C3, and C4 are discussed in reference to the present implementation, the number of imaging devices 14 may vary based on the specifications of the particular imaging devices and/or the desired number of fields of view 18 for the display screen 20. The imaging devices C1, C2, C3, and C4 may be disposed on the vehicle 10 and oriented such that each field of view 18 of the imaging devices 14 is directed toward a substantially different region. A first imaging device C1 may be disposed centrally on a rear facing portion of the vehicle 10 proximate a tailgate or similar area of the vehicle 10. In some embodiments, the first imaging device C1 may be disposed proximate a rear-bumper and/or a center high mount stop light (CHMSL). In this way, the field of view 18 of the first imaging device C1 can include the roadway behind the vehicle 10 as well as the horizon above the roadway. A second imaging device C2 and a third imaging device C3 may be disposed on a passenger's side 28 and a driver's side 29 of the vehicle 10, respectively. The second imaging device C2 and the third imaging device C3 may be configured to capture image data corresponding to the environment proximate the side regions of the vehicle 10. The fourth imaging device C4 may be configured to capture image data in a forward direction relative to an operating direction of the vehicle 10. The fourth imaging device C4 may be disposed in a housing of the rearview display 22 or any other portion of the vehicle 10 positioned to capture image data forward of the vehicle 10.

In some implementations, the second imaging device C2 and the third imaging device C3 may be incorporated in the side mirrors 31 of the vehicle 10. The imaging devices C2 and C3, in combination with the first imaging device C1, may be configured to capture image data corresponding to a rearward-directed region relative the forward direction of the vehicle 10. In some embodiments, the imaging devices 14 may be configured to capture an increased or decreased viewing angle depending on the particular application. Furthermore, the imaging devices may be configured to capture approximately the entire environment surrounding the vehicle 10.

Referring to FIGS. 1B and 1C, the reference numeral 30 generally designates an imaging device 30 lens cover for the vehicle 10 that includes a cover 24 disposed proximate an imaging device lens 34. The cover 24 is configured to allow the imaging device 30, which may be an imaging device alternative to the first imaging device C1, to capture image data from a field of view 18 through the cover 24. Similarly to the first imaging device C1, the imaging device 30 may include a field of view 18 of the roadway behind the vehicle 10 as well as the horizon above the roadway. In some examples, the cover 24 includes an electro-optic device that may be positioned within a housing 36 of a vehicle antenna 32. In this way, the cover 24 may be in the form of a light filter 24 that includes an electro-optic functionality configured to transmit or absorb a range of wavelengths of light, thereby obscuring the visibility of the imaging device 14. In some examples, the electro-optic device 24 is in the form of an electrochromic device that selectively absorbs light. Various implementations of an imaging device lens cover are described in U.S. application Ser. No. 16/407,818, now published as U.S. Patent Application Publication No. 2019/0346742, entitled "SWITCHABLE IMAGER LENS COVER", filed Jun. 15, 2018, by David J. Cammenga, which is incorporated by reference in its entirety.

Figure 2:
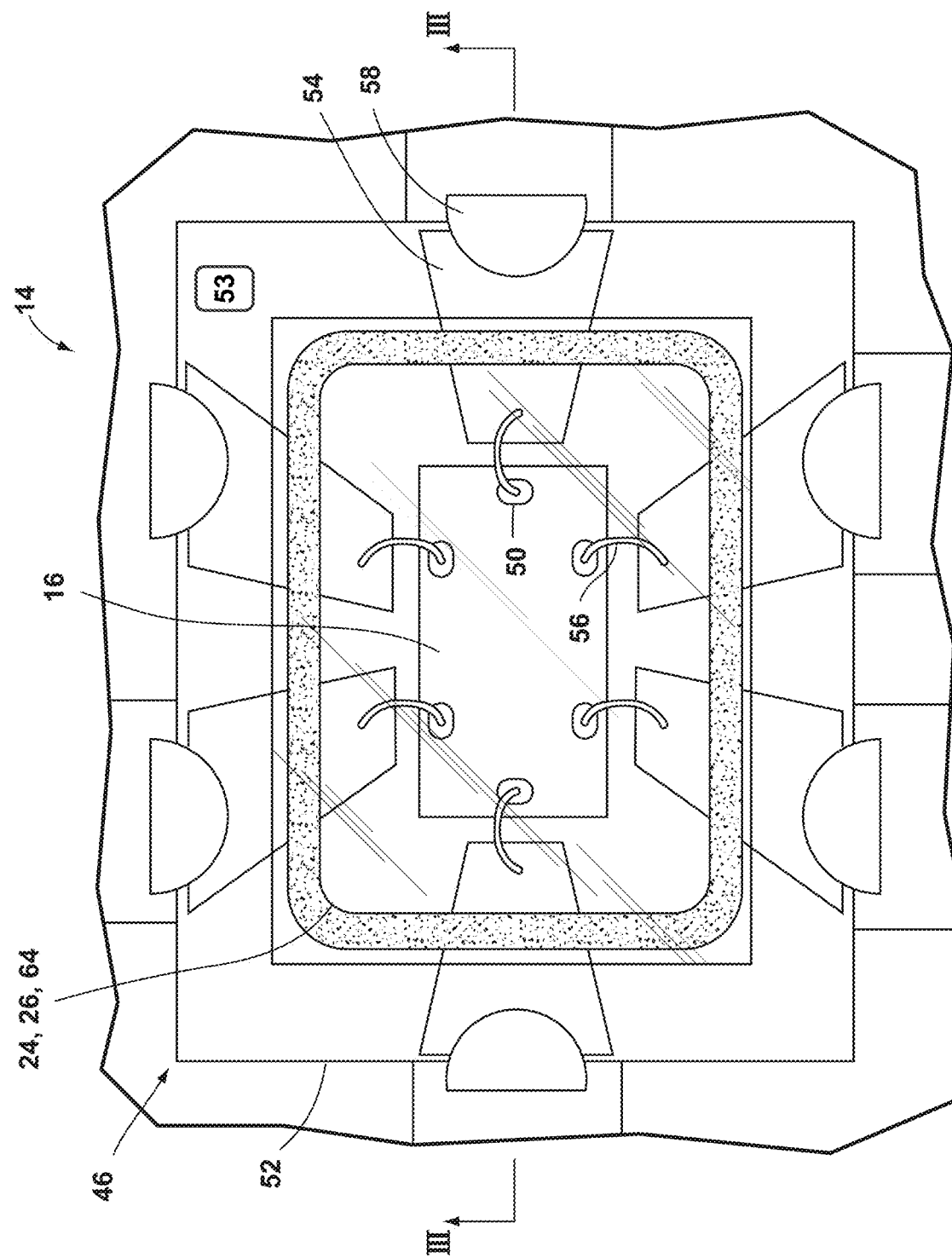
FIG. 2 is a front elevational view of an imaging device.

FIG. 2 illustrates the imaging device 14 including an image sensor 16 according to various aspects of the disclosure. In some examples, the cover, or light filter 24, may be configured to limit the transmission of a range or plurality of ranges of light from entering the image sensor 16. The light filter 24 may be selectively activated based on an operating environment of the vehicle 10 such that one or more wavelengths or ranges of wavelengths of light are transmitted or absorbed by the light filter 24 prior to entering the image sensor 16. In this way, the imaging device 14 may control the wavelengths of light received by the image sensor 16 in response to a variety of operating conditions of the vehicle 10. In some aspects, the image sensor 16 may include an aspect ratio of 16:9 or 4:3, but is not limited to such. While shown in a landscape aspect ratio orientation in FIG. 2, which may include a 16:9 or 4:3 aspect ratio, the image sensor 16 may be rotated, or positioned, in any suitable orientation, which may include portrait aspect ratios. For example, a portrait aspect ratio may include 9:16 or 3:4. It may be beneficial for the rear imager C1 (FIG. 1A) to include an image sensor 16 oriented in the landscape orientation, while the imaging devices C2 and C3 may include image sensors 16 oriented in the portrait orientation.

Each of the imaging devices 14 may include a plurality of primary color filters 26 (e.g., red, green and blue color filters). For example, one can use a dielectric micropatterned color filter array with high transmission bands in the visible and NIR spectral range while maintaining a high optical density elsewhere. The primary color filters 26 may be configured to have a high level of transmittance in a near infrared range (NIR) and/or the infrared (IR) range. The NIR range may correspond to wavelengths of light approximately between wavelengths of 700 and 1000 nm or 700 to 2500 nm. The light filter 24 may be configured to selectively filter light in the NIR range. In this way, the light in the NIR range may be selectively filtered such that all or part of the light in the NIR range is selectively prevented from entering the image sensor 16. A controller of the imaging device 14 may be operable to control the light filter 24 such that the light in the NIR range is selectively transmitted through the active light filter 24. The selective filtering of the light filter 24 is discussed in further detail in reference to FIGS. 5-7 and the controller is discussed in further detail in reference to FIG. 8.

By controlling the wavelengths of light received by the imaging devices 14, the imaging assembly, or system 12, may provide advantages by capturing the light in the NIR. Light in the NIR range may enhance the recognition and detection capability for the driver or for Advanced Driver Assistance Systems (ADAS) when compared to cameras detecting only in the visible spectral range. Cameras with sensitivity in the NIR range may provide a better visibility and better recognition of elements during driving, for example, of pedestrians, bicycles, animals, vehicle lights, traffic signs, road markings, and in particular during adverse environmental conditions that may include fog, rain, smoke, or snow.

In some embodiments, the controller (FIG. 8) may control the operation of the light filter 24 in response to the ambient light conditions, which may include daytime conditions and nighttime conditions. It is understood that the daytime condition refers to camera operation using visible wavelengths of light and the nighttime condition refers to using visible and near-infrared light. The invention is not limited to solely using either mode to a specific time of day. Applications are discussed below which demonstrate the utility of using the modes separately or in conjunction with different lighting conditions. Various implementations for controlling the wavelengths of light received by the imaging devices are described in U.S. Pat. No. 8,237,909 B2, entitled "IMAGING DEVICE WITH SWITCHABLE DAY AND NIGHT MODES", filed Apr. 25, 2018, by Mario F. Saenger Nayver, which is incorporated by reference in its entirety.

In daytime conditions, the light in the NIR range may be filtered from the received light impinging upon the image sensor 16. In this way, the imaging device 14 may prevent high-intensity infrared light from reaching the entire image sensor 16 in order to increase the color sensitivity and improve the color rendering index of image data captured during daylight conditions.

During nighttime conditions, light in the NIR range may provide beneficial information to the operator of the vehicle 10, which may include displaying the information on the display 20, or a driver-assistance system in communication with one or more of the imaging devices 14. Accordingly, the selective control of the light lifter 24 of the imaging system 12 by the controller may enable selectively filtering of light in the NIR range to suit a variety of operations and operating conditions of the vehicle 10. In various embodiments, the disclosure provides for an imaging device 14 that is operable to selectively control a range of light (e.g., infrared light or NIR light) received by the image sensor 16 such that valuable information in the IR or NIR range may be captured during nighttime operating conditions in a first portion of the field of view 18 and filtered from a second portion of the field of view 18, In some examples, the image sensor 16 includes a lower region corresponding to a roadway, or a first portion of the field of view 18, and an upper region corresponding to a horizon, or the second portion of the field of view 18. Light in the IR and MR range may provide for visibility or detection of objects that may not otherwise be visible in the image data captured by the image sensor 16. In some examples, the roadway behind the vehicle 10 during nighttime operating conditions may include colored lights from emergency vehicles, such as red or blue lights. The red and blue lights may appear as white light if not viewed through an IR filter and the operator of the vehicle 10 may not recognize the red and blue vehicle lights. The horizon above the roadway may be viewed through an IR filter to improve the color rendering index of image data so that the red and blue lights above the horizon will appear as red and blue, respectively.

In some examples, the image sensor 16 with the light filter 24 may work together with a NIR light source 53, external or embedded to the device, such as NIR light emitting diodes (LEDs). NIR LEDs typically produce wavelengths of 850 nm and/or 940 nm. The 850 nm wavelength may be more efficient while having some slight visibility of red. This configuration may enhance the visibility in situations with poor illumination conditions. The NIR LEDs may be continuously on during an MR camera mode operation or can be synchronized in case the imaging system 12 is in a switching mode so that the LEDs are working when the NIR function is active. By turning off the NIR light source 53 during visible mode operation, light leakage to the visible image may be minimized. Such leakage may otherwise decrease the color rendering index (CRI).

Furthermore, the NIR light source 53 may be selectively activated such that during nighttime operating conditions, the NIR light source is directed to the roadway as opposed to the entire field of view 18. Thus, the roadway, or a first portion of the field of view 18, may be illuminated by the NIR light source, while the horizon, or a second portion of the field of view 18 may not be illuminated by the NIR light source.

The controller of the imaging device 14 may be configured to control the filter 24 to absorb or otherwise inhibit the passage of a first range of wavelengths (e.g., the NIR range) during bright ambient lighting conditions that may correspond to daylight conditions for the entire field of view, including the first and second portions. To provide for such functionality, the light filter 24 may comprise an electro-optic element, or device, configured to absorb or inhibit the passage of light in the first range of wavelengths in a first state. For example, the controller may control the light filter 24 to significantly inhibit the passage of the light in the first range of wavelengths. In this way, the imaging device 14 may capture image data with high color sensitivity and improved color rendering during daylight conditions. Additionally, the electro-optic filter 24 can be configured to allow the passage of light in the first range of wavelengths in a second state during dark ambient lighting conditions that may correspond to nighttime conditions for the first portion of the field of view, including the roadway while simultaneously absorbing the light in the first range of wavelengths for the second portion of the field of view, including the horizon.

As discussed below, in some examples, the light filter 24 may be optimized to transmit or block certain bands of light in the near-infrared spectrum. In examples wherein the actively controlled band(s) are substantially greater than 700 nm to 800 nm, additional blocking means may be employed to improve the color rendering index of the sensor. For example, if the light filter 24 is optimized for 825 nm+/−50 nm, then the light of wavelengths between up to 775 nm may pass through to the sensor. These wavelengths, in some sensor configurations, may be interpreted as red light. This will degrade the color rendering of the sensor and the resultant display image will be inappropriately biased toward the red colors.

Figure 3:
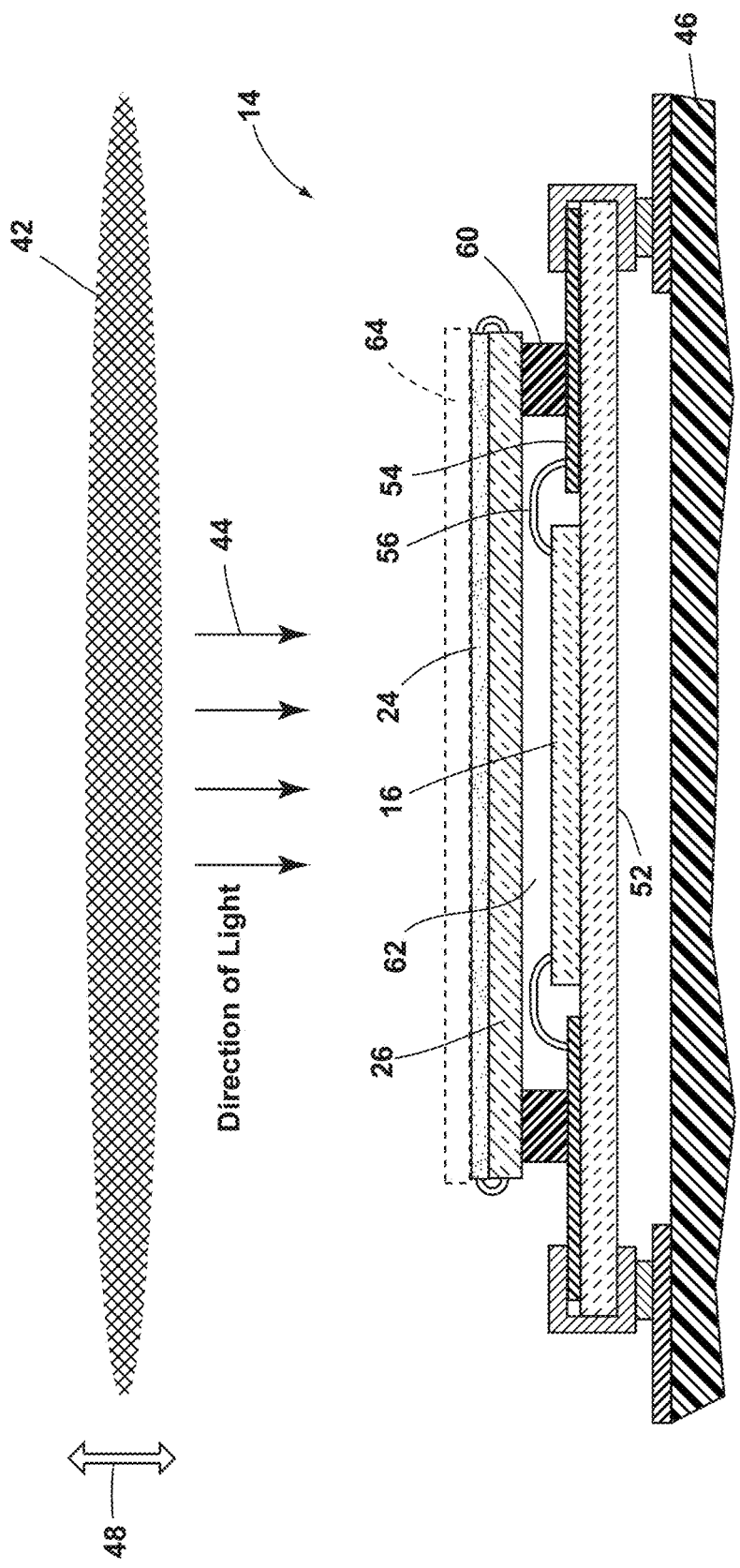
FIG. 3 is a cross-sectional view of the imaging device demonstrated in FIG. 2 along section line 3-3.

Referring now to FIGS. 2 and 3 a focusing lens 42 may be utilized in combination with the imaging device 14 to focus entering light 44 received by the imaging device 14. The focusing lens 42 may be in connection with a lens assembly, which may further be in connection with an enclosure assembly 46 configured to house the image sensor 16. In this configuration, the focusing lens 42 may be adjusted as demonstrated by an arrow 48 to adjust the focus and/or the focal distance of the entering light 44 entering the image sensor 16. The enclosure assembly 46 may be designed to be mounted on a support substrate, or base substrate 52.

The support substrate 52 may correspond to a printed circuit board, flexible circuit, ceramic substrate, or the like. In some examples, NIR light source 53 may be coupled to the support substrate 52. However, the NIR light source 53 may be disposed at any suitable position coupled to the imaging assembly 12. FIGS. 2 and 3 show the light filter 24 located between the image sensor 16 and the focusing lens 42. It is understood that alternate embodiments are considered wherein the light filter 24 is located forward of the focusing lens 42 or other lenses in the lens assembly or even forward of all lenses in the lens assembly, such as in the lens cover as discussed previously. As discussed herein, in some examples, the light filter 24 can be in the form of an electro-optic element 24. The electro-optic element 24 may be located in the optical path to the image sensor 16 between the image sensor 16 and the entering light 44 and may be arranged in a stacked configuration with the primary color filters 26. With appropriate detection algorithms, red, green, blue (RGB) and NIR imaging data collected by the image sensor 16 may be utilized to gather information about the road condition, such as the presence of water or ice.

In some embodiments, the color rendering index may be improved by adding a static blocking filter 64 into the system. The static blocking filter 64 may be a multilayer band pass filter, a dual band pass filter, or the like, which may be located on one or more surfaces of the light filter 24 between the incoming light and the image sensor 16 and may include sections of surfaces corresponding to the second portion of the field of view, including the horizon. In some examples, a band pass filter may be an IRC 20 or IRC 21 filter, provided by Sunex, which can block all IR wavelengths. Alternatively, the band pass filter may be an IRC 40 or IRC 41 filter, provided by Sunex, which allows for the passage of a large portion of LED emission at 850 nm. In this manner, the light filter 24 may still be employed and high color rendering indices may be achieved. The effective optical density of the static blocking filter 64 may be less than about 0.5, less than about 1, less than about 2, less than about 3, or less than about 4. The higher optical density values along with the wavelength band blocked by the filter will provide improved color rendering values when the system is in the daylight or visible mode and can be selected to achieve the desired color rendering index of the system.

Additionally, the system may include anti-reflection coatings on one or more of the surfaces of the lenses or other component surfaces. The anti-reflection coating may be optimized for at least one of the visible or near infrared spectrum or may demonstrate a broadband anti-reflection property over wavelengths of interest for a given application. A motheye anti-reflection, graded interface, or other suitable broadband anti-reflection coating may be used.

The image sensor 16 may be integrated as an integrated device comprising an array of pixel sensors and support electronics. Accordingly, the image sensor 16 may comprise imaging electronics, such as pixel sensors, constructed on the image sensor 16. The imaging electronics may be connected to bonding pads 50 configured to provide bonding points for connections of the image sensor 16. In this configuration, the image sensor 16 may be configured for various applications. The bonding pads 50 are not shown in the cross-sectional views for clarity.

In various embodiments, the image sensor 16 may be attached to an upper side of a base substrate 52. The image sensor 16 may be attached by adhering a bottom side of the image sensor 16 to the base substrate 52. The base substrate 52 may be constructed from a non-conducting material, such as glass or ceramic. Though specific examples of materials are provided for the base substrate 52 as well as various additional elements of the imaging device 14, such information is provided to better describe exemplary embodiments and should not be considered limiting to the scope of the disclosure.

Conductive strips 54 may provide for conductive communication from the image sensor 16 to an edge of the base substrate 52. A wire 56 may be configured to connect pads on the image sensor 16 with the conductive strips 54. The base substrate 52 may further provide for conductive communication with one or more processors or circuits via a plurality of traces 58. In this configuration, the one or more processors, which may form the controller of the imaging device 14, may receive image data from the image sensor 16 via the wire 56. The wire 56 is in communication with the conductive strip 54, which is further in connection with the trace 58 of the base substrate 52. In this configuration, the image sensor 16 may communicate image data to a processor or image processor to provide image data for various applications.

A seal material 60 may surround the image sensor 16 and enclose each of the wires 56. The seal material 60 may be spaced from the edge of the base substrate 52 such that a seal material 60 does not interfere with the assembly of clips onto the base substrate 52. The filter 24 may be attached to the base substrate 52 in a spaced-apart relationship, which may be determined by a thickness of the seal material 60. The primary color filters 26 may be configured to have a high level of transmittance in a near infrared (NIR) range and/or the infrared (IR) range. The optical density of the primary color filters 26 in the NIR or IR should be less than about 1, less than about 0.5, or less than about 0.1. As discussed herein, the light filter 24 may be configured to control a passage or transmittance of light rays 44 into the imaging electronics of the image sensor 16. In this configuration, the base substrate 52, the seal material 60, and the light filter 24 may form a cavity 62 containing an image sensor 16.

Figure 4:
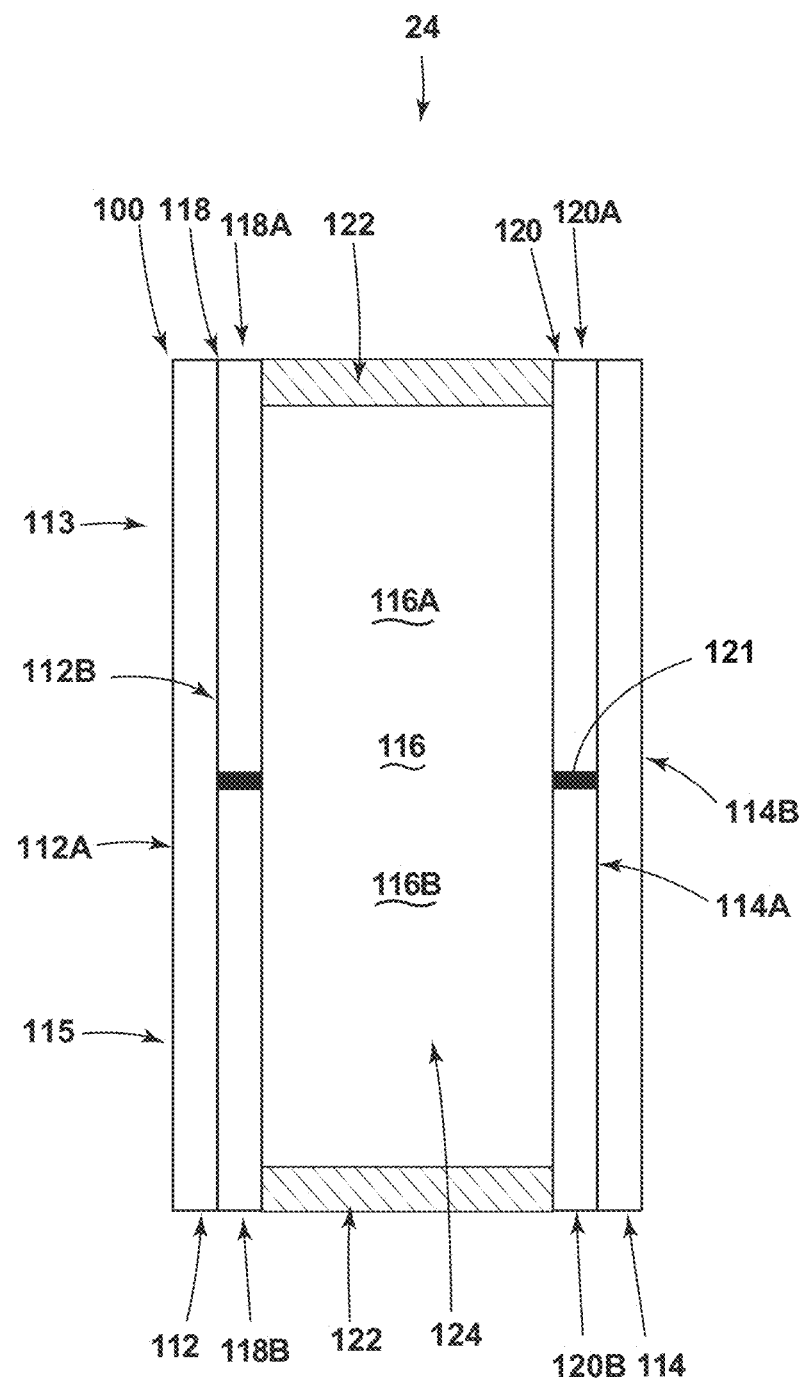
FIG. 4 is a cross-sectional schematic representation of an electro-optic assembly, according to one aspect of the present disclosure.

FIG. 4 illustrates a schematic representation of the electro-optic element, or electrochromic device, or light filter 24. In some examples, the electrochromic device 24 can include first substrate 112 having a first surface 112A and a second surface 112B, and a second substrate 114 having a third surface 114A and a fourth surface 114B. The second surface 112B and the third surface 114A may have associated therewith transparent conductive electrodes 118 and 120, respectively. The first substrate 112 and the second substrate 114, along with a sealing member 122 define a chamber 116 for containing an electro-optic material, such as an electrochromic medium 124.

In some examples, the chamber 116 may be segmented, or sectioned, such that the electrochromic device 24 includes a first portion, or a first chamber 116A and a second portion, or a second chamber 116B. The first chamber 116A may correspond to an upper chamber 116A and the second chamber 116B may correspond to a lower chamber 116B such that the electrochromic device 24 may be include a first, or upper portion 113, and a second, or lower portion 115. According to some aspects, the upper chamber 116A may receive incoming light from the horizon, or second portion of the field of view 18 that may enter an upper region of the image sensor 16, and the lower chamber 116B may receive incoming light from the roadway, or first portion of the field of view 18 that may enter the lower region of the image sensor 16. One or both of the conductive electrodes 118 and 120 may be separated and electrically isolated into corresponding upper portions 118A, 120A, and lower portions 118B, 120B. Accordingly, the upper chamber 116A is electrically isolated from the lower chamber 116B. Such separation may be implemented by laser etching one or both of the transparent conductive electrodes 118 and 120. As an alternative to segmenting the electro-optic device 24 into a first chamber 116A and a second chamber 1163, it is within the scope of the disclosure to provide two or more electrochromic devices, which is described with respect to FIG. 5.

Upon mounting as a mirror, window, filter, or other device, the electrochromic device 24 may optionally include a bezel that extends around a periphery of at least one of the first substrate 112 and/or the second substrate 114 to conceal and/or protect components of the electrochromic device 24 and the like, such as a bus connector (if present) and the sealing member 122.

Several other electrochromic device configurations are contemplated for use, including, but not limited to, those disclosed in U.S. Pat. No. 6,193,912 entitled "Near Infrared-Absorbing Electrochromic Compounds and Devices Comprising Same," which is hereby incorporated herein by reference in its entirety including all references incorporated therein.

According to an aspect of the present disclosure, the first substrate 112 and the second substrate 114 may be fabricated from any one of a number of materials that are transparent or substantially transparent to light having a wavelength in the visible and NIR regions of the electromagnetic spectrum, such as, for example, borosilicate glass, soda lime glass, or polymeric materials such as natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, as well as cyclic olefin copolymers commercially available from TOPAS® Advanced Polymers.

In another aspect, the first substrate 112 and the second substrate may be fabricated from a sheet of glass or polymeric material having a thickness ranging from about 0.10 millimeters (mm) to about 12.7 mm. This may include any range of thickness such as from about 0.50 mm to about 1.50 mm, or from about 0.65 mm to about 1.00 mm. The thickness of the first substrate 112 may be selected to obtain particular electrochromic device characteristics. While particular substrate materials have been disclosed, for illustrative purposes only, it will be understood that numerous other substrate materials are likewise contemplated for use, so long as the materials are at least substantially transparent and exhibit appropriate physical properties, such as strength, to be able to operate effectively in conditions of intended use. Indeed, electrochromic devices in accordance with the present disclosure can be, during normal operation, exposed to extreme temperature variation as well as substantial UV radiation, emanating primarily from the sun. It will be further understood that first substrate 112 and/or second substrate 114 may comprise a UV absorbing layer and/or contain a UV absorbing material (not shown) to help protect the substrate(s) 112, 114 and/or the electrochromic medium 124 from UV damage.

In some aspects, the second substrate 114 may be fabricated from similar or different materials than that of the first substrate 112. If the first and second substrates 112, 114 are fabricated from sheets of glass, then the glass can optionally be tempered, heat strengthened, chemically strengthened, and/or laminated prior to or subsequent to being coated with layers of electrically conductive material.

One or more layers of an electrically conductive material used to form the transparent conductive electrode 118 may be associated with, or disposed on, the second surface 112B of the first substrate 112. The electrically conductive material is desirably a material that includes one or more of the following features: (a) is substantially transparent to light in the visible and/or NIR region of the electromagnetic spectrum; (b) bonds reasonably well to the first substrate 112; (c) maintains the bond to the first substrate 112 when associated with a sealing member 122; (d) is generally resistant to corrosion from materials contained within the electro-optic device 24 or the atmosphere; and/or (e) exhibits minimal diffuse or specular reflectance as well as sufficient electrical conductance. It is contemplated that the electrically conductive material may be fabricated from fluorine doped tin oxide (FTO), for example TEC™ glass, indium/tin oxide (ITO), doped zinc oxide, indium zinc oxide, metal oxide/metal/metal oxide (wherein metal oxide can be substituted with metal carbide, metal nitride, metal sulfide, etc.), or other materials known to those having ordinary skill in the art.

The transparent conductive electrode 120 may include one or more layers of an electrically conductive material made of the same or different materials as those associated with the second surface 112B of the first substrate 112. In the case where the transparent conductive electrode 120 is electrically isolated into an upper conductive surface 120A and a lower conductive surface 120B, the first chamber 116A may be in electrical communication with the upper conductive surface 120A and the second chamber 116B may be in electrical communication with the lower conductive surface 120B. The first chamber 116A may not be physically separated from the second chamber 116B. The electro-optic device 24 may be controlled electronically such that the electro-optic device 24 includes a modal capability to switch between absorbing and transmitting a range of wavelengths through the upper chamber 116A and the lower chamber 116B independently. The switching time between the absorbing state and the transmitting state may be equal or less than approximately 10 seconds, 8 seconds, 6 seconds, 4 seconds, 2 seconds, or equal to or less than 1 second.

The first and second substrates 112, 114 may be substantially transparent and have a cell distance of less than 600 μm. In other aspects, the first substrate 112 and second substrate 114 may have a cell distance of about 150 μm to about 600 μm, about 200 μm to about 300 μm, about 225 μm to about 275 μm, or ranges between any two of these values (including endpoints). In still other aspects, the first substrate 112 and second substrate 114 may have a cell distance of about 350 μm, 300 μm, 275 μm, 250 μm, 225 μm, 200 μm, 175 μm, 150 μm, 125 μm, 100 μm, 90 μm, 80 μm, 70 μm, 60 μm, 50 μm, 40 μm, 30 μm, 20 μm, 10 μm, or ranges between any two of these values (including endpoints). In still more aspects, the first substrate 112 and the second substrate 114 may have a cell distance of about 250 μm.

The sealing member 122 may include any material that is configured to adhesively bond to the electrically conductive materials or conductive electrodes 118 and 120 coated on the first and second substrate 112, 114 to, in turn, seal the chamber 116 so that electro-optic medium, or electrochromic medium 124, does not inadvertently leak out of the chamber 116 or be exposed to the outside atmosphere. It is also contemplated that the sealing member 122 extends all the way to the second surface 112B and third surface 114A of the first and second substrates 112, 114, respectively. In such aspects, the layers of conductive electrodes 118 and 120 coated on the first and second substrates 112, 114 may be partially removed where the sealing member 122 is positioned. It will be understood that the sealing member 122 can be fabricated from any one of a number of materials including, for example, those disclosed in U.S. Pat. No. 4,297,401, issued Oct. 27, 1981 and entitled "Liquid Crystal Display and Photopolymerizable Sealant Therefor,"; U.S. Pat. No. 4,418,102, issued Nov. 29, 1983 and entitled "Liquid Crystal Displays having Improved Hermetic Seal,"; U.S. Pat. No. 4,695,490, issued Sep. 22, 1987 and entitled "Seal for Liquid Crystal Display,"; U.S. Pat. No. 5,596,023, issued Jan. 21, 1997 and entitled "Sealing Material for Liquid Crystal Display Panel, and Liquid Crystal Display Panel Using It,"; U.S. Pat. No. 5,596,024, issued Jan. 21, 1997 and entitled "Sealing Composition for Liquid Crystal,"; U.S. Pat. No. 6,157,480, issued Dec. 5, 2000 and entitled "Seal for Electrochromic Device,"; and U.S. Pat. No. 6,714,334, issued Mar. 30, 2004 and entitled "Electrochromic Device having a Seal including an Epoxy Resin Cured with a Cycloaliphatic Amine," the contents of which are incorporated herein by reference in their entirety.

Figure 5:
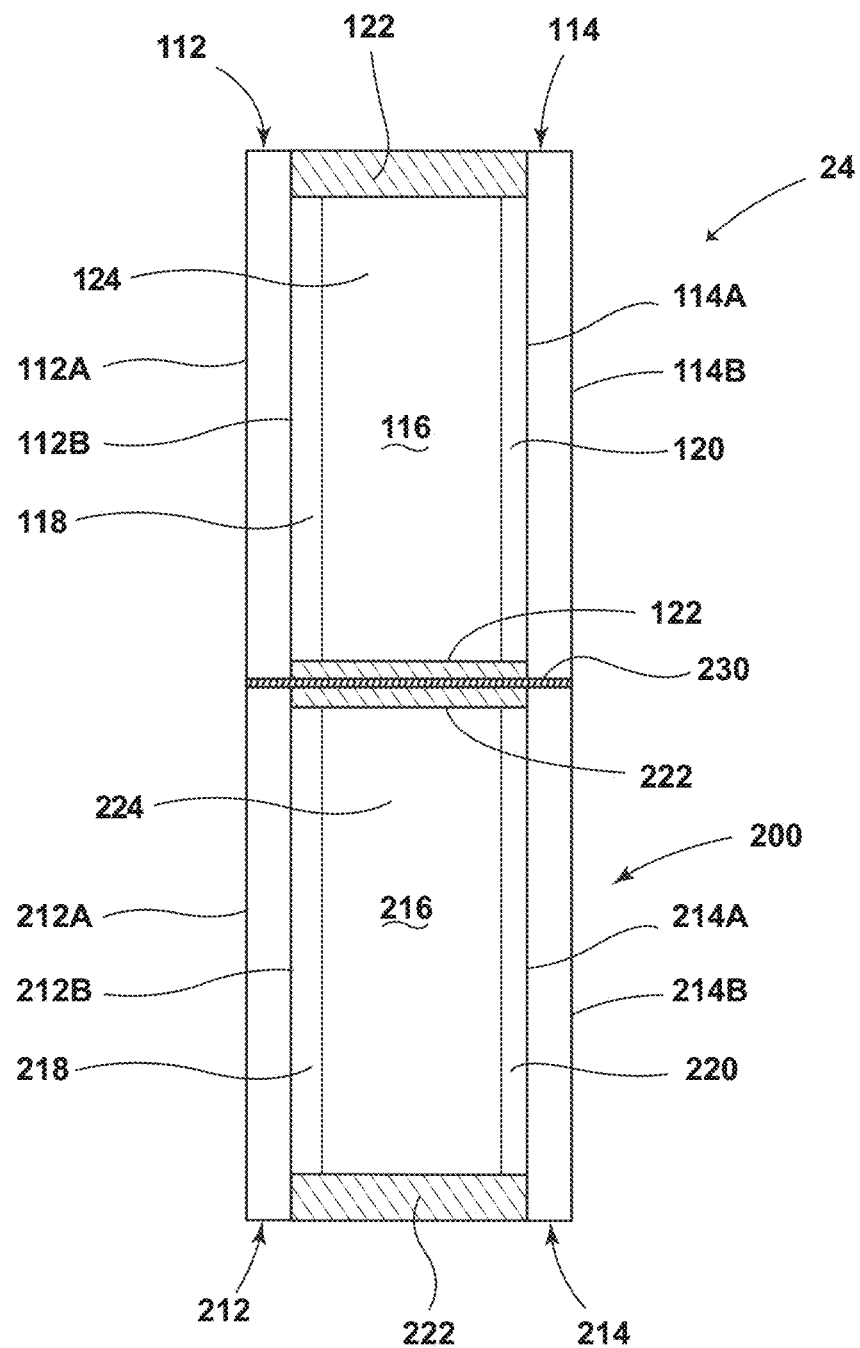
FIG. 5 is a cross-sectional schematic representation of a stacked electro-optic device, according to one aspect of the present disclosure.

Referring now to FIG. 5, a cross-sectional schematic of two, stacked, electro-optic devices 24 and 200 is illustrated. The electro-optic device 200 may be substantially similar to the electro-optic device 24. Therefore, similar components will include a reference number increased by 200, unless otherwise identified. Accordingly, the description with respect to the electro-optic device 24 applies to the electro-optic device 200 unless otherwise stated.

In some examples, the light filter includes the electro-optic device 24 coupled to the electro-optic device 200, which may include a stacked position as illustrated in FIG. 5. The electro-optic device 24 and the electro-optic device 200 may be coupled in any suitable manner, which may include the use of an adhesive 230, fasteners, such as clips, and the like. The electro-optic device 24 and the electro-optic device 200 may be sized such that the first substrates 112 and 212 are in alignment and the second substrates 114 and 214 are in alignment. As such, the chamber 116 may correspond to a first, or upper chamber, and the chamber 216 may correspond to a second, or lower chamber.

According to some implementations, the electro-optic material 124 may be configured to selectively absorb a first a range of wavelengths of entering the image sensor 16 and the electro-optic material 224 may be configured selectively to absorb a second range of wavelengths of light entering the image sensor 16, different from the first range of wavelengths. In specific examples, the first range of wavelengths corresponds to light in the near infrared (NIR) spectrum and the second range of wavelengths corresponds to light in the visible spectrum. The visible spectrum may include wavelengths of light from approximately 400 to 700 nm. In specific implementations, the electro-optic device 200 may be configured to selectively absorb the light in the second range of wavelengths from the first portion of the field of view 18, including the roadway and the electro-optic device 24 may be configured to selectively absorb the light in the first range of wavelengths for the second portion of the field of view, including the horizon, but is not limited to such.

Figure 6:
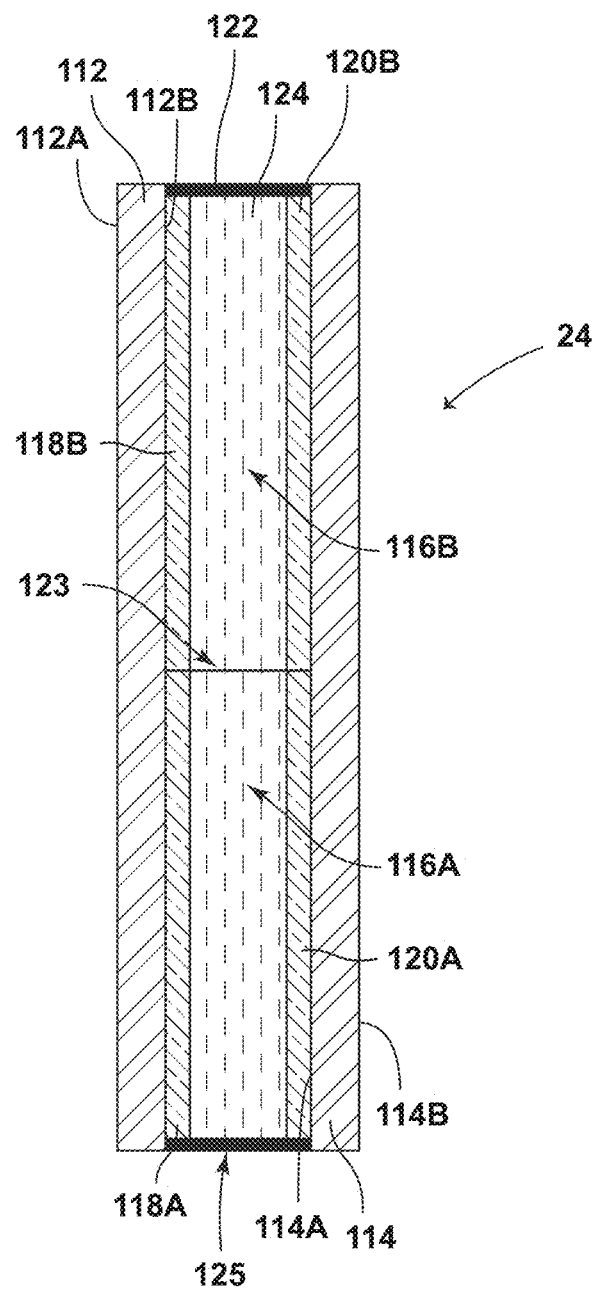
FIG. 6 is a cross-sectional schematic representation of an electro-optic cell for a non-limiting example of an electro-optic infrared filter according to one aspect of the present disclosure.

Referring now to FIG. 6, in some aspects, the electro-optic device 24 is a switchable, physically segregated, electro-optic infrared filter 125. In some aspects, the electro-optic infrared filter 125 in FIG. 6 is similar to the electro-optic infrared filter in FIG. 4 with the difference being that the electro-optic infrared filter 125 in FIG. 6 includes the chambers 116A and 116B physically separated by a thin seal 123. The seal 123 may include any suitable material for separating the chambers 116A and 116B. Electrical contacts are made to the conductive electrodes 118A, 118B, 120A, 120B coupled to the second and third surfaces 112B, 114A in order to provide electrical current to independently switch the electro-optic medium 124 of chambers 116A and 116B between their substantially transmissive and substantially absorptive states. In some aspects, the electro-optic device 24 has a transmissivity in the transmissive state (e.g., clear state), or substantially transmissive state, of greater than 70% for light having a wavelength in the near infrared region of the electromagnetic spectrum. In some aspects, the electro-optic device 24 has a transmissivity in the absorptive state (e.g., filtering state), or substantially absorptive state, of less than 1% for light having a wavelength in the near infrared region of the electromagnetic spectrum. Varying levels of transmission and absorption to near-infrared light may be obtained by partially transitioning the electro-optic device 24 between the substantially transmissive and substantially absorptive states.

Figure 7:
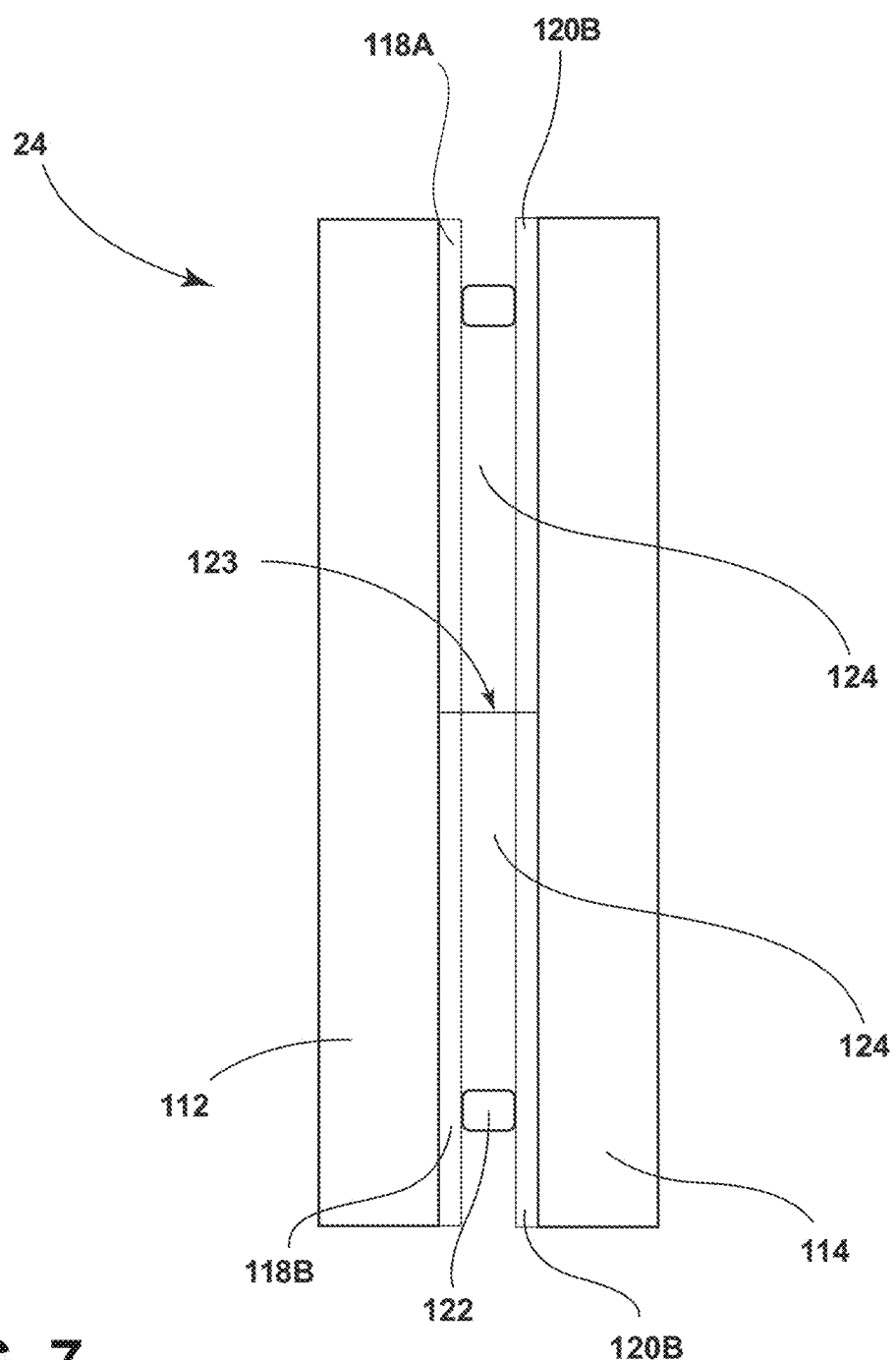
FIG. 7 is a cross-sectional schematic representation of an electro-optic cell for a non-limiting example of an electro-optic infrared filter according to one aspect of the present disclosure.

Referring now to FIG. 7, in some aspects, electrical contact to the conductive electrodes 118A, 118B, 12A, 120B is simplified positioning the sealing member 122 inward from the outer edge of the first and second substrates 112, 114 in order to expose electrode faces at each end of the cell. Many other electrical contact methods are well characterized in the prior art (e.g., as described in U.S. Pat. No. 8,274,729, issued Sep. 15, 2012 and entitled "Thin-Film Coatings, Electra-Optic Elements and Assemblies Incorporating these Elements," the contents of which are incorporated herein by reference in their entirety) and can be adapted for use herein. When the cell is powered, the conductive electrode 118A, 118B, 120A, 120B at which oxidation occurs is referred to as the anodic surface and the other of the conductive electrode 118A, 118B, 120A, 120B at which reduction occurs is referred to as the cathodic surface. When the cell is powered, the electrochromic compound M is oxidized at the anodic surface to form the M-oxidized compound and the electrochromic compound M is reduced at the cathodic surface to form the M-reduced compound.

Each of the chambers 116A, 116B may be selectively powered, or activated, to filter light in a predetermined range of wavelengths of light in a first state and pass the light in a second state. For example, applying power to the chamber 116A may result in the upper portion 113 of the electro-optic device 24 to filter, or absorb, the predetermined range of wavelengths while passing the visible light to the image sensor 16. In some examples, the range of wavelengths includes from approximately 750 nm to 850 nm. In some examples, a daylight mode may correspond to both the upper portion 113 and the lower portion 115 passing visible light while filtering IR light in the first state, while a nighttime mode may correspond to the upper portion 113 filtering IR light in the first state and the lower portion 115 passing the visible and IR light in a second state. In the case where the imaging device 14 is rear imager such as C1 (FIGS. 1A, 1B), the upper portion 113 may include a field of view 18 corresponding with the horizon, or the second portion of the field of view 18, while the lower portion 115 may include a field of view 18 corresponding with the roadway, or first portion of the field of view 18.

As noted above, the daylight and nighttime modes may be initiated under different situations other than simply based on ambient light intensity levels. For example, under circumstances, such as fog or smog, IR or NIR light may penetrate and enable imaging better than visible light. In these and other circumstances, the mode of the camera may be switched from visible to IR/NIR to provide optimal information about the scene. In other embodiments, the modes may be interlaced enabling a simultaneous visible video feed with infrared machine analysis one or more of the fields of view 18. In some embodiments, the image data from the NIR light range may be combined with the visible range during daytime or in conditions where there is a high amount of detectable visible light. For example, such a configuration could be desirable to enhance visibility during a day with fog or smog.

The electro-optic device 24, as disclosed herein, may be implemented as an electrochromic device comprising a single-layer, single-phase component, multi-layer component, or multi-phase component, as described in U.S. Pat. No. 5,928,572 entitled "Electrochromic Layer and Devices Comprising Same," U.S. Pat. No. 5,998,617 entitled "Electrochromic Compounds," U.S. Pat. No. 6,020,987 entitled "Electrochromic Medium Capable of Producing a Pre-selected Color," U.S. Pat. No. 6,037,471 entitled "Electrochromic Compounds," U.S. Pat. No. 6,141,137 entitled "Electrochromic Media for Producing a Pre-selected Color," U.S. Pat. No. 6,241,916 entitled "Electrochromic System," U.S. Pat. No. 6,249,369 entitled "Coupled Electrochromic Compounds With Photostable Dication Oxidation States," U.S. Pat. No. 6,137,620 entitled "Electrochromic Media With Concentration Enhanced Stability, Process for the Preparation Thereof and Use in Electrochromic Devices"; and U.S. Pat. No. 6,519,072 entitled "Electrochromic Device"; and International Patent Application Publication Nos. WO 1998/42796 entitled "Electrochromic Polymeric Solid Films, Manufacturing Electrochromic Devices Using Such Solid Films, and Processes for Making Such Solid Films and Devices," and WO 99/02621 entitled "Electrochromic Polymer Systems," which are herein incorporated by reference in their entirety.

Figure 8:
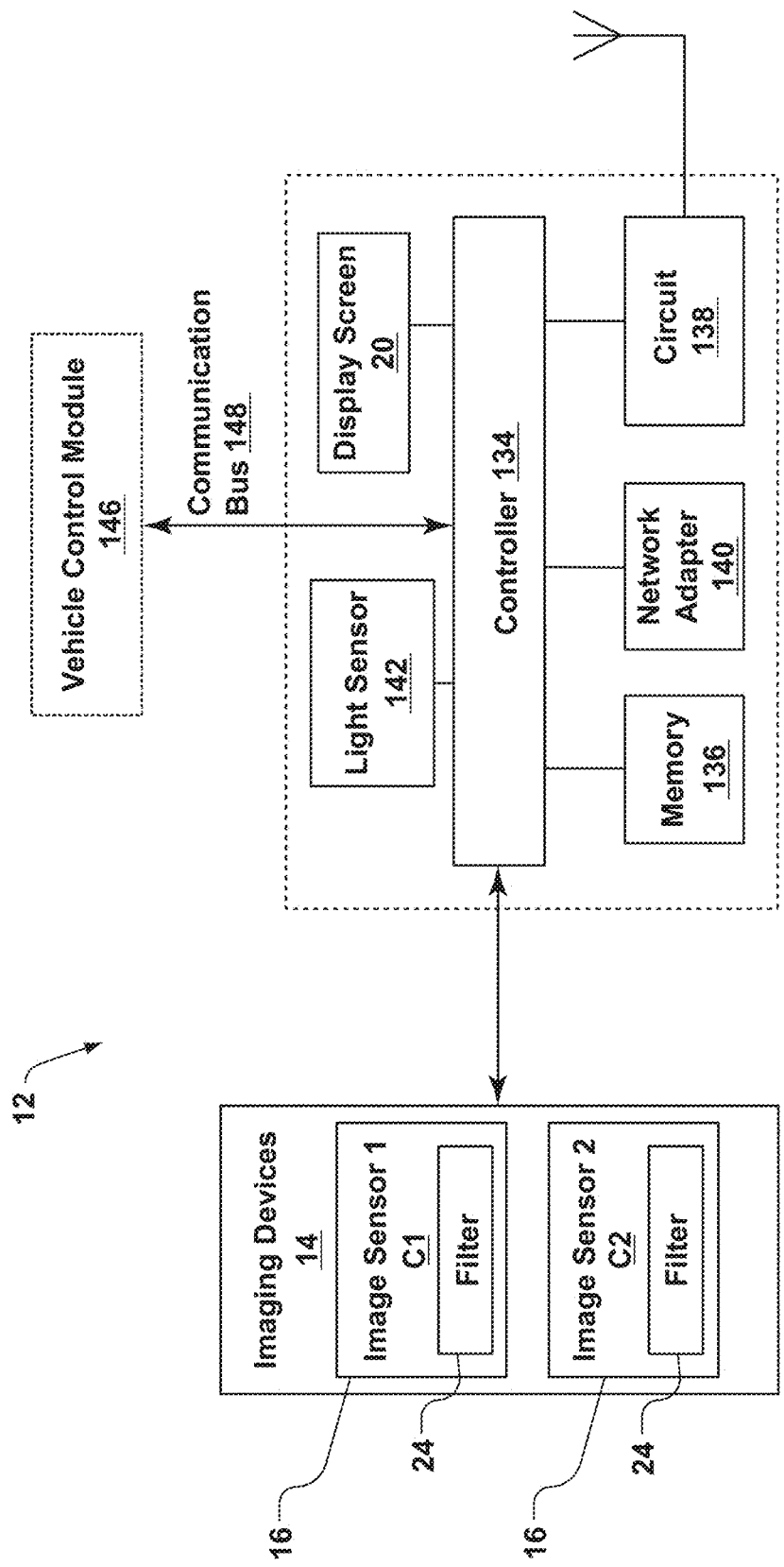
FIG. 8 is a block diagram of an imaging system in accordance with the disclosure.

Referring now to FIG. 8, a block diagram of the imaging system 12 is shown. The imaging system 12 may comprise a display screen 20. The display screen 20 may be implemented as a variety of display types. For example, the display screen 20 may correspond to a liquid crystal display (LCD), a plasma display, an organic light emitting diode (OLED) display, a field emission display (FED) panel, or various other displays. The display screen 20 may further incorporate a speaker, haptic feedback device (e.g., vibration motor), LEDs, or various other hardware components for providing an output.

The imaging system 12 may further comprise a controller 134. The controller 134 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In some embodiments, the controller 134 may be a system on a chip (SoC) individually or with additional hardware components described herein. The controller 134 may include a memory 136 (e.g., random access memory, read-only memory, flash memory, hard disk storage, flash memory storage, solid-state drive memory, etc. Accordingly, the controller 134 may be operable to control the imaging system 12 including the image sensors 16, the light filter 24 and the NIR light source 53.

The memory 136 may be used to facilitate the functions of the imaging system 12 as described herein. Memory 136 may include computer code modules, data, computer instructions, or other information, which may be executed by the controller 134 or otherwise facilitate the functions of the imaging system 12 described herein. For example, the memory 136 may include processing instructions, identification information, device registry configurations, image processing and augmentation information, etc. The memory 136 and/or the controller 134 may facilitate the functions described herein using one or more programming techniques, data manipulation techniques, and/or processing techniques, such as using algorithms, routines, lookup tables, arrays, searching, databases, comparisons, instructions, etc.

The imaging system 12 may further comprise a communication circuit 138. The communication circuit 138 may correspond to a transceiver circuit or transmitter circuit coupled to the controller 134. The transceiver circuit may provide for the imaging system 12 to transmit and/or receive wireless communication signals. The wireless communication signals may be transmitted to or received from a variety of wireless devices (e.g., an original transmitter, home electronic device, mobile communications device, and/or remote device). The communication circuit 138 may be controlled by the controller 134. For example, the controller 134 may turn on or off the communication circuit 138, the controller 134 may send data using the communication circuit 138, format information, an activation signal, control signal, and/or other signals or data for transmission via the communication circuit 138, or otherwise control the communication circuit 138. Inputs from the communication circuit 138 may also be received by the controller 134. For example, software configurations, updates, user settings and other information may be received by the communication circuit 138 and stored in the memory 136 by the controller 134.

The controller 134 may be also coupled to a network adapter 140, receivers, and/or transmitters. In some embodiments, the network adapter 140 may be configured to communicate with the imaging devices 14. In some embodiments, the network adapter 140 may be or include a cellular transceiver. In this configuration, the imaging system 12 may use the network adapter 140 and/or an additional transceiver (e.g., a cellular transceiver) to access the internet, other networks, and/or network hardware. In some embodiments, the imaging system 12 may access the internet, other networks, and/or network hardware through an intermediate device in communication with the imaging system 12 such as the mobile device.

In an exemplary embodiment, the network adapter 140 may be configured to send receive data and/or control signals to a mobile device. The network adapter 140 may communicate via various wireless communication protocols. For example, communication protocols may include, but are not limited to, Bluetooth® (e.g., a Bluetooth® low energy (BLE), Wi-Fi® (IEEE 802.11), ZigBee®, cellular, etc.), a wired interface and/or protocol (e.g., Ethernet, universal serial bus (USB), Firewire®, etc.), or other communication connections (e.g., infrared, optical, ultrasound, etc.).

In some embodiments, the imaging system 12 may comprise an ambient light sensor 142. The ambient light sensor 142 may be configured to identify an operating condition or light level of an operating environment of the imagining system 12. The ambient light sensor 142 may be in communication with the controller 134 and configured to communicate light data indicating an ambient lighting condition proximate the vehicle 10 (e.g., daylight condition, nighttime condition). In response to the indication of the lighting condition, the controller 134 may selectively activate the light filter 24 such that one or more ranges of light are filtered from the received light impinging upon the image sensor 16 via one or more of the upper portion 113 and lower portion 115 of the light filter. In this way, the imaging device 14 may prevent high-intensity infrared light from reaching at least one of the upper portion 113 and lower portion 115 of the image sensor 16 in order to increase the color sensitivity and improve the color rendering index of image data captured during daylight or nighttime conditions. In some examples, the controller 134 activates the absorbing state of the electro-optic device 24 in response to an intensity of ambient light exceeding a predetermined threshold identifying the daylight condition.

The controller 134 may be in communication with a vehicle control module 146 via a communication bus 148 of the vehicle 10. The communication bus 148 may be configured to deliver signals to the controller 134 identifying various states of the vehicle 10. For example, the communication bus 148 may be configured to communicate an operating condition of the vehicle 10 (e.g., the ignition is active, a gear selection, a lighting activation or setting, etc.), an ambient light level, a seat occupancy, a door ajar signal, driver/occupant identity or any other information or control signals that may be communicated via the communication bus 148. In this way, the controller 134 may communicate with the vehicle control module 146 to identify a variety of conditions and/or settings of the vehicle 10.

The following references may include various implementations for imager systems providing rearward facing panoramic views and are incorporated herein by reference in their entirety: U.S. Pat. No. 8,237,909 B2, entitled "VEHICLE REARVIEW MIRROR ASSEMBLY INCLUDING INTEGRATED BACKLIGHTING FOR A LIQUID CRYSTAL DISPLAY (LCD)," filed Feb. 6, 2009, by John B. Ostreko et al.; and U.S. Pat. No. 8,411,245, entitled "MULTI-DISPLAY MIRROR SYSTEM AND METHOD FOR EXPANDED VIEW AROUND A VEHICLE," filed Sep. 30, 2009, by Ethan J. Lee et al. Though the imaging system 12 in the various implementations disclosed herein is shown incorporated in a rearview display system, a display may similarly be incorporated in a vehicle forward center console, as a heads-up display, or in any other location that may be visible to an operator or occupant of a vehicle.

The controller 134 may operable to capture image data corresponding to the upper region and the lower region of the image sensor 16. The controller 134 may control the electro-optic element 24 to absorb the range of near infrared (NIR) wavelengths of light entering the upper region of the image sensor 16. Additionally, the controller 134 may control the electro-optic element 24 to absorb the range of NIR wavelengths entering the lower region of the image sensor 16 in a first state and transmit the range of NIR wavelengths entering the image sensor 16 in a second state in response to the ambient lighting condition. The controller 134 may be further operable to display the image data in the display screen 20 of the vehicle 10. As previously discussed, the controller 134 may selectively activate the infrared light source 53 during the nighttime condition, which may be directed to a roadway.

According to one aspect of the present disclosure, an imaging assembly for use in a vehicle includes an image sensor that is configured to capture image data of a rearward view. The image sensor has a lower region and an upper region. An electro-optic element is configured to selectively control a range of wavelengths of light entering the image sensor. The electro-optic element includes an upper chamber, a lower chamber that is electrically isolated from a first chamber, and a controller that is in communication with the image sensor and the electro-optic element. The controller is operable to switch at least one of the upper chamber and the lower chamber between an absorbing state and a transmitting state.

According to another aspect, the upper chamber is configured to absorb the range of wavelengths entering the upper region of the image sensor. The lower chamber is configured to absorb the range of wavelengths entering the lower region of the image sensor in the absorbing state and transmits the range of wavelengths entering the lower region of the image sensor in the transmitting state.

According to yet another aspect, the range of wavelengths corresponds to light in a near infrared (NIR) range.

According to another aspect, the controller is further operable to switch the at least one of the upper chamber and the lower chamber between the absorbing state and the transmitting state in response to an environmental lighting condition and identifies the lighting condition as a daylight condition or a nighttime condition.

According to yet another aspect, the controller is operable to activate the absorbing state in response to an intensity of ambient light that exceeds a predetermined threshold identifying the daylight condition.

According to another aspect, a switching time between the absorbing state and the transmitting state is equal to or less than approximately 10 seconds.

According to yet another aspect, the upper chamber is electrically isolated from the lower chamber.

According to another aspect, the upper chamber and the lower chamber are physically separated by a thin seal.

According to yet another aspect, the electro-optic element further comprises a first substrate having a first surface and a second surface, a first transparent conductive electrode that is disposed on the second surface, a second substrate having a third surface and a fourth surface, a second transparent conductive electrode that is disposed on the third surface, an electro-optic material that is disposed between the first transparent conductive electrode and the second transparent conductive electrode, and laser etching on the first transparent conductive electrode and the second transparent conductive electrode. The laser etching electrically isolates an upper chamber and a lower chamber.

According to another aspect of the present disclosure, a method of selectively switching an electro-optic element in response to an ambient lighting condition includes capturing image data corresponding to an upper region and a lower region of an image sensor and controlling the electro-optic element to absorb a range of near infrared (NIR) wavelengths of light entering an upper region of the image sensor and absorbing the range of NIR wavelengths entering the lower region of the image sensor in a first state and transmitting the range of NIR wavelengths entering the image sensor in a second state in response to an ambient lighting condition.

According to another aspect, the method displays image data in a display of a vehicle.

According to still another aspect, the method identifies an ambient lighting condition as a daylight condition or a nighttime condition.

According to yet another aspect, the method controls an electro-optic element to activate a first state in response to an intensity of ambient light that exceeds a predetermined threshold identifying the daylight condition.

According to another aspect, a switching time between the first state and the second state is equal to or less than approximately 10 seconds.

According to yet another aspect, the method selectively activates an infrared light source directed to a roadway during the nighttime condition.

According to another aspect of the present disclosure, an imaging assembly includes an image sensor that is configured to capture image data and an electro-optic element that is configured to selectively control a range of wavelengths corresponding to light in a near infrared (NIR) range of light entering the image sensor. The electro-optic element includes a first portion that is configured to absorb the range of wavelengths entering the image sensor and a second portion that is configured to absorb the range of wavelengths entering the image sensor in a first state and to transmit the range of wavelengths entering the image sensor in a second state. The second portion is electrically isolated from the first portion. A controller is in communication with the image sensor and the electro-optic element. The controller is operable to switch the second portion between the first state and the second state.

According to another aspect, the controller is further operable to switch the second portion between the first state and the second state in response to an environmental lighting condition and to identify the lighting condition as a daylight condition or a nighttime condition.

According to yet another aspect, the controller is operable to activate the first state in response to an intensity of ambient light that exceeds a predetermined threshold identifying the daylight condition.

According to still another aspect, the imaging assembly further comprises an infrared light source that is directed to a roadway. The controller is operable to selectively activate the infrared light source during a nighttime condition.

According to another aspect, the image sensor is disposed on a vehicle and is configured to capture image date of a rearward view.

It will be understood by one having ordinary skill in the art that construction of the described invention and other components is not limited to any specific material. Other exemplary embodiments of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An imaging assembly for use in a vehicle, the imaging assembly comprising:
    a single image sensor configured to capture image data of a rearward view, the image sensor having a lower region and an upper region; and
    an electro-optic element configured to selectively control a range of wavelengths of light entering the image sensor, wherein the electro-optic element comprises:
        an upper chamber configured to selectively control a range of wavelengths of light entering the upper region of the image sensor; and
        a lower chamber electrically isolated from the upper chamber, the lower chamber configured to selectively control a range of wavelengths of light entering the lower region of the image sensor; and
        a controller in communication with the image sensor and the electro-optic element, wherein the controller is operable to:
            switch at least one of the upper chamber and the lower chamber between an absorbing state and a transmitting state.

2. The imaging assembly according to claim 1, wherein the range of wavelengths corresponds to light in a near infrared (NIR) range and the upper chamber is configured to absorb the range of wavelengths entering the upper region of the image sensor and the lower chamber is configured to absorb the range of wavelengths entering the lower region of the image sensor in the absorbing state and to transmit the range of wavelengths entering the lower region of the image sensor in the transmitting state.

3. The imaging assembly according to claim 1, wherein the upper chamber corresponds to an upper region of a field of view corresponding to a roadway and the lower chamber corresponds to a lower region corresponding to a horizon.

4. The imaging assembly according to claim 1, wherein the controller is further operable to:
    switch the at least one of the upper chamber and the lower chamber between the absorbing state and the transmitting state in response to an environmental lighting condition; and
    identify the lighting condition as a daylight condition or a nighttime condition.

5. The imaging assembly according to claim 4, wherein the controller is operable to activate the absorbing state in response to an intensity of ambient light exceeding a predetermined threshold identifying the daylight condition.

6. The imaging assembly according to claim 1, wherein a switching time between the absorbing state and the transmitting state is equal to or less than approximately 10 seconds.

7. An imaging assembly for use in a vehicle, the imaging assembly comprising:
    an image sensor configured to capture image data of a rearward view, the image sensor having a lower region and an upper region; and
    an electro-optic element configured to selectively control a range of wavelengths of light entering the image sensor, wherein the electro-optic element comprises:
        an upper chamber; and
        a lower chamber electrically isolated from the upper chamber; and
    a controller in communication with the image sensor and the electro-optic element, wherein the controller is operable to:
        switch at least one of the upper chamber and the lower chamber between an absorbing state and a transmitting state,
    wherein the upper chamber is electrically isolated from the lower chamber by laser etching at least one transparent conductive electrode.

8. The imaging assembly according to claim 1, wherein the upper chamber and the lower chamber are physically separated by a thin seal.

9. The imaging assembly according to claim 1, wherein the electro-optic element further comprises:
    a first substrate having a first surface and a second surface;
    a first transparent conductive electrode disposed on the second surface;
    a second substrate having a third surface and a fourth surface;
    a second transparent conductive electrode disposed on the third surface;
    an electrochromic medium disposed between the first transparent conductive electrode and the second transparent conductive electrode; and
    laser etching on the first transparent conductive electrode and the second transparent conductive electrode, wherein the laser etching electrically isolates the upper chamber and the lower chamber.

10. A method of selectively switching an electro-optic element in response to an ambient lighting condition, the method comprising:
    capturing image data corresponding to an upper region and a lower region of a single image sensor, wherein the upper region corresponds to a roadway and the lower region corresponds to a horizon; and
    controlling an electro-optic element to:
        absorb a range of near infrared (NIR) wavelengths of light entering the upper region of the image sensor; and
        absorb the range of NIR wavelengths entering the lower region of the image sensor in a first state and transmit the range of NIR wavelengths entering the image sensor in a second state in response to an ambient lighting condition.

11. The method according to claim 10, further comprising:
    displaying the image data in a display of a vehicle.

12. The method according to claim 10, further comprising:
    identifying the ambient lighting condition as a daylight condition or a nighttime condition.

13. The method according to claim 12, further comprising:
    controlling the electro-optic element to activate the first state in response to an intensity of ambient light exceeding a predetermined threshold identifying the daylight condition.

14. The method according to claim 10, wherein a switching time between the first state and the second state is equal to or less than approximately 10 seconds.

15. The method according to claim 12, further comprising:
selectively activating an infrared light source directed to the roadway during the nighttime condition such that the horizon is generally not illuminated by the infrared light source.

16. An imaging assembly for use in a vehicle, the imaging assembly comprising:
an image sensor configured to capture image data; and
an electro-optic element configured to selectively control a range of wavelengths corresponding to light in a near infrared (NIR) range of light entering the image sensor, wherein the electro-optic element comprises:
a first portion configured to absorb the range of wavelengths entering the image sensor; and
a second portion configured to absorb the range of wavelengths entering the image sensor in a first state and to transmit the range of wavelengths entering the image sensor in a second state, the second portion electrically isolated from the first portion; and
a controller in communication with the image sensor and the electro-optic element, wherein the controller is operable to:
switch the second portion between the first state and the second state,
wherein the first portion is electrically isolated from the second portion by laser etching at least one transparent conductive electrode.

17. The imaging assembly according to claim 16, wherein the controller is further operable to:
switch the second portion between the first state and the second state in response to an environmental lighting condition; and
identify the lighting condition as a daylight condition or a nighttime condition.

18. The imaging assembly according to claim 17, wherein the controller is operable to activate the first state in response to an intensity of ambient light exceeding a predetermined threshold identifying the daylight condition.

19. The imaging assembly according to claim 17, further comprising:
an infrared light source directed to a roadway, wherein the controller is operable to selectively activate the infrared light source during a nighttime condition.

20. The imaging assembly according to claim 17, wherein the controller is operable to activate the second state in response to identifying the nighttime condition.

* * * * *